（12）United States Patent
Kautz

(10) Patent No.: US 9,707,852 B2
(45) Date of Patent: Jul. 18, 2017

(54) PROTECTIVE SHIELD FOR AN ELECTRIC VEHICLE INDUCTIVE CHARGING PAD

(71) Applicant: FORD GLOBAL TECHNOLOGIES, LLC, Dearborn, MI (US)

(72) Inventor: Richard William Kautz, North Branch, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 396 days.

(21) Appl. No.: 14/574,554

(22) Filed: Dec. 18, 2014

(65) Prior Publication Data

US 2016/0176299 A1    Jun. 23, 2016

(51) Int. Cl.
| | |
|---|---|
| *H02J 7/00* | (2006.01) |
| *B60L 11/18* | (2006.01) |
| *H02J 5/00* | (2016.01) |
| *H02J 17/00* | (2006.01) |
| *H02J 7/02* | (2016.01) |
| *H02J 50/10* | (2016.01) |
| *H02J 50/70* | (2016.01) |
| *H02J 50/60* | (2016.01) |

(52) U.S. Cl.
CPC ............ *B60L 11/182* (2013.01); *H02J 5/005* (2013.01); *H02J 7/025* (2013.01); *H02J 17/00* (2013.01); *H02J 50/10* (2016.02); *H02J 50/60* (2016.02); *H02J 50/70* (2016.02)

(58) Field of Classification Search
CPC ......... B60L 11/182; H02J 17/00; H02J 50/10; H02J 50/60; H02J 50/70; H02J 5/005; H02J 7/025
See application file for complete search history.

(56) References Cited

U.S. PATENT DOCUMENTS

| | | | |
|---|---|---|---|
| 2013/0099563 | A1 | 4/2013 | Partovi et al. |
| 2013/0175983 | A1 | 7/2013 | Partovi et al. |
| 2013/0249682 | A1 | 9/2013 | Van Wiemeersch et al. |
| 2013/0285605 | A1* | 10/2013 | Partovi ............... H02J 7/0042 320/108 |
| 2014/0159479 | A1* | 6/2014 | Nomura ............... H01F 27/346 307/9.1 |
| 2015/0069833 | A1* | 3/2015 | Yuasa ............... B60L 11/182 307/10.1 |

* cited by examiner

*Primary Examiner* — Vuthe Siek
(74) *Attorney, Agent, or Firm* — David B. Kelley; Brooks Kushman P.C.

(57) ABSTRACT

A vehicle includes a vehicle coil assembly configured to couple with a ground coil assembly in a presence of a magnetic field therebetween for wireless power transfer to the vehicle. The vehicle coil assembly includes an inflatable shield configured to extend from the vehicle and form a barrier around a portion of the magnetic field.

20 Claims, 5 Drawing Sheets

PROTECTIVE SHIELD FOR AN ELECTRIC VEHICLE INDUCTIVE CHARGING PAD

TECHNICAL FIELD

This disclosure relates to electric vehicle charging pads and protective covers therefor.

BACKGROUND

Inductive wireless power transfer (WPT) utilizes magnetic coupling between two magnetic field coupling units (i.e., a primary coil and a secondary coil). WPT systems may be used to charge electric vehicles as well as mobile devices, medical devices, etc. Typical coupling units may include charging pads that utilize strong alternating current (AC) magnetic fields to couple power to vehicles at rates comparable to conductive charging cables (e.g., 3.3 kW or more). Such power requires high field strength over the charging pads. Certain requirements, however, may set limits on access or exposure to electromagnetic fields of WPT systems.

SUMMARY

A vehicle includes a vehicle coil assembly configured to couple with a ground coil assembly in a presence of a magnetic field therebetween for wireless power transfer to the vehicle. The vehicle coil assembly includes an inflatable shield configured to extend from the vehicle and form a barrier around a portion of the magnetic field.

A primary coil assembly includes a primary coil configured to couple with a secondary coil within a vehicle for wireless power transfer to the vehicle, and a shield assembly extending around the primary coil. The shield assembly includes a sensor configured to provide sensor data and an expandable shield configured to extend from the primary coil to the secondary coil to form a barrier around a portion of a magnetic field between the coils. The primary coil assembly further includes a controller programmed to activate the primary coil based on the sensor data.

A wireless power transfer method includes, in response to data indicative of alignment between a primary inductive coil and a vehicle mounted secondary inductive coil, commanding a flexible shield surrounding one of the coils to expand towards the other of the coils; and, in response to data indicative of a pressure within the shield falling within a predefined range, commanding the primary inductive coil to initiate wireless power transfer to the secondary inductive coil.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

WPT for electric vehicles may be implemented using primary charging stations. These charging stations may enable charging of electric cars to improve their driving range and usability. A ground coil assembly at the charging station may couple with a vehicle coil assembly to wirelessly transmit power from the charging station to the vehicle. The power transfer is facilitated by a magnetic field created between the coil assemblies. Such a field may create magnetic field leakage near the coil assemblies. A shield assembly may be included within one or both of the coil assemblies and may surround regions of the magnetic field. During power transfer, an extendable shield may contain at least a portion of the leakage to the area between the two coil assemblies.

The shield assembly may also include a sensor coupled to a controller. The sensor and controller may permit power transfer when the shield is fully extended. Upon detecting that the shield is not fully extended, the coils may be instructed to cease power transfer. Thus, the shield assembly may prohibit power transfer in the event of an obstruction or object within the charging area. The shield assembly may also provide for temperature monitoring, flame detection and control, cooling functions, and shutdown triggers.

Figure 1:
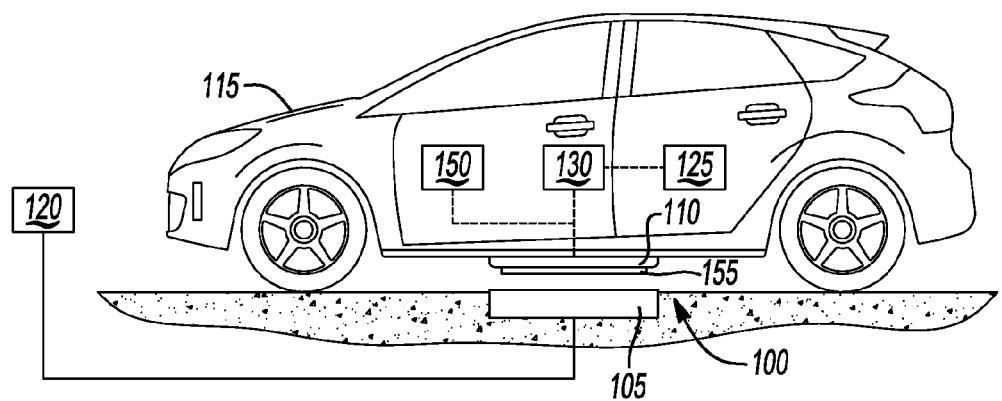
FIG. 1 illustrates a wireless power transfer system for a vehicle.

FIG. 1 is an exemplary wireless power transfer system 100 showing a primary coil assembly 105 and a secondary coil assembly 110 within a vehicle 115. The primary coil assembly 105 may be connected to an external power source and associated controller 120. The vehicle 115 may include a rechargeable battery 125 and power electronics 130 (including a rectifier) operatively arranged with the secondary coil assembly 110. The primary and secondary coil assemblies 105, 110 each may include at least one coil (e.g., a primary coil and a secondary coil, respectively). As current flows through the primary coil, the energy emitted from the primary coil may be received at the secondary coil, and used to charge the battery 125. That is, power received at the secondary coil assembly 110 may flow through the power electronics 130 to the battery 125.

One or both of the coil assemblies 105, 110 may include a shield device 155 (also referred to as shield assembly 155). The shield device 155 (as shown in an un-extended state in FIG. 1) may be a cover configured to create a shield or barrier around the coil assemblies 105, 110. Once the coil assemblies 105, 110 are aligned, a shield 160 (shown in FIG. 2) may extend from one of the assemblies 105, 110 and create an enclosed area around the coils. For example, the shield 160 may have a flexible material and may extend from the secondary assembly 110. Upon expansion, the shield 160 may abut to the primary assembly 105. The shield 160 may create an enclosure around the coils so that when the coils couple and an electromagnetic field is created therebetween, the field created by the coupling is primarily contained within the interior of the shield 160. In some examples, the shield 160 may have four sides to encase the coils. In other examples, the shield 160 may have a rounded or balloon-type shape. Further, while the shield device 155 is described as being included in the secondary coil assembly 110, the shield device 155 may additionally or alternatively be included at the primary coil assembly.

The shield 160 may be expanded by several mechanisms described herein. In one example, gas may be forced into the interior of the shield 160, facilitating expansion. In another example, support members may be arranged at the corners of the shield device 155 and may facilitate the expansion and retraction of the shield 160. These mechanisms are described in more detail below.

The shield 160 may be made of a flexible, non-metal material such as plastic. Other materials having low electrical conductivity may also be used. In some examples, the shield 160 may be made of material that melts under high heat, or be a bag-like device made of flame-retardant material. As such, the shield 160 may limit available oxygen in the vicinity of debris trapped between the coil assemblies 105, 110. Additionally or alternatively, any gas used to expand the shield 160 may be a suppressing gas such as $CO_2$. If for example the debris causes a hole in the shield 160, the $CO_2$ may escape through the hole and bathe the debris in $CO_2$.

A control module 150 (also referred to as controller 150) may be coupled to the power electronics 130 and/or the secondary coil assembly 110, and may be configured to control the shield device 155 and mechanism therein. The control module 150 may be part of an electronic control module within the vehicle 115. The control module 150 may instead be a stand-alone controller configured to control the shield device 155. The controller 150 may include a memory and a processor for carrying out computer readable instructions, and may interface with other systems. The controller 150, for example, may communicate with the primary coil assembly 105. The control module 150, for example, may also interface and communicate with specific features within the shield device 155 such as, but not limited to, a gas device 170, sensors 175, 195, etc. (shown in FIG. 2).

Figure 2:
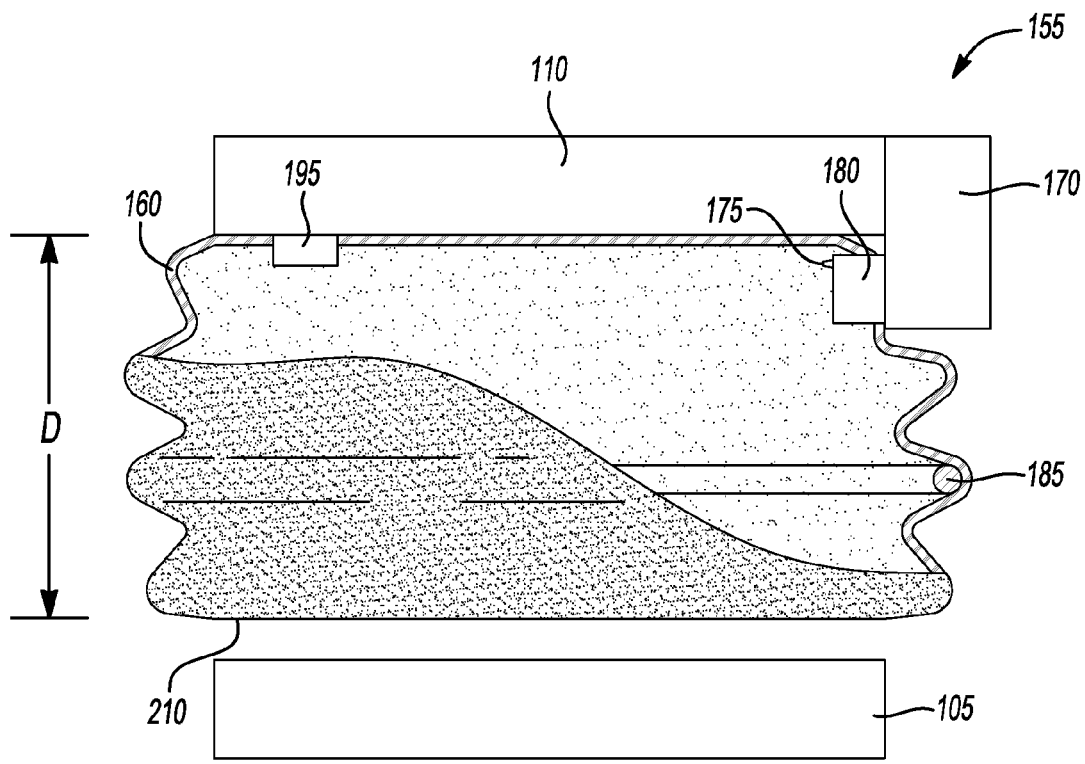
FIGS. 2-4 and 7 illustrate side views of shield assemblies with portions of the shields broken away.

FIG. 2 illustrates the expanded shield device 155 extending from the secondary assembly 110. When the shield device 155 is not in use, the shield 160 may be maintained at or against the secondary assembly 110. That is, the shield 160 may be retractable so as to not interfere with the normal operations of the vehicle 115. During WPT between the primary and secondary assemblies 105, 110, the shield 160 may be expanded.

The shield device 155 may include the shield 160 and a gas device 170. The gas device 170, such as a pressurized tank of gas and associated dispensing mechanisms, is configured to insert gas into the shield 160. The gas device 170 may insert air, $CO_2$, or other gases. The gases may provide cooling to the interior of the shield 160. Additionally, the gases may aid in inflating or expanding the shield 160.

The gas device 170 may include a sensor 195 configured to gather and transmit sensor data to the control module 150. The sensor 195 may also be in communication with the gas device 170 to control the amount of gas flow into the interior of the shield 160. The sensor data may include data indicative of the expansion of the shield 160. In one example, the sensor 195 may be an air pressure sensor and the sensor data may be indicative of an air pressure within the interior of the shield 160. In another example, the sensor 195 may be an infrared or ultrasonic sensor capable of providing sensor data (e.g., a time delay) indicative of a distance between the secondary coil assembly 110 and a bottom of the shield 160, as represented as distance D in FIG. 2. In yet another example, the sensor 195 may be a thermometer configured to monitor the temperature within the interior of the shield 160. In still yet another example, the sensor 195 may be an ultrasound or acoustic sensor configured to sense the volume of air in the shield 160 based on an acoustic resonant frequency or a modal response of an ultrasound wave reflecting off of the bottom of the shield 160 (a wave reflecting off of a primary coil surface.)

The sensor data may be transmitted to the control module 150 and the control module 150 may evaluate and analyze the data. Upon the evaluation, the control module 150 may determine whether the shield 160 is fully extended. The control module 150 may determine if the sensor data falls within a predefined range. In one example, if the sensor data includes an air pressure that is within the range, it may indicate that the shield 160 is fully extended, or inflated. If the sensor data falls outside the range, it may indicate that the pressure is too high due to an object being within the charging area. If the air pressure is less than the range, it may be possible that the shield 160 is not fully extended due to a fault in the shield 160 (e.g., a hole in the shield), thus preventing the shield 160 from fully extending. In the case in which the sensor data indicates that the shield 160 is not fully extended, the control module 150 may send a command to the respective coil assembly 110 to discontinue WPT (or cease sending an enabling signal). In addition to the sensor data representing an air pressure within the shield 160, the sensor data could also represent an amount of gas pumped into the shield 160.

Once the sensor data indicates that the shield 160 is fully extended, the control modules 120, 150 may initiate WPT. The sensor data may be received at the control module 150 in real-time or near real-time throughout the alignment of the coil assemblies 105, 110 including during power transfer. If a change in the sensor data is detected (e.g., if the air pressure changes), the control module 150 may transmit the appropriate commands to cease, initiate, or re-initiate charging. For example, if during WPT the sensor data indicates that the shield 160 is no longer fully inflated, the control module 150 may instruct WPT to cease.

The gas device 170 may include a controller (not shown) for communicating with the sensor 195. Additionally or alternatively, the sensor 195 may communicate directly with the control module 150. The sensor 195 may transmit the sensed air pressure to the control module 150. The control module 150 may then make the appropriate adjustments to the flow of gas. For example, if the air pressure exceeds a predefined amount, the gas device 170 may cease to flow air into the interior of the shield 160. In the event that the sensor 195 is not an air pressure sensor (e.g., a distance sensor such as infrared or ultrasonic), the gas device 170 may include a gas sensor 175 separate from sensor 195. The gas sensor 175 may provide air pressure data to the gas controller so that adjustments to the air flow may be made. (In the example of FIG. 2, the shield device 155 is associated with the secondary coil assembly 110. In other examples, the shield device 155 may be associated with the primary coil assembly 105 as mentioned above. Operations of the controller 150 described herein, in these circumstances, may be performed by the controller 120.)

The gas device 170 may also include an inlet or nozzle 180 whereby the gas may enter the interior of the shield 160. The gas device 170 may be any device capable of producing gas or air flow. In one example, the gas device may be a fan, including a motor and impeller or reciprocating or diaphragm pump, configured to present air into the shield 160. The gas device 170 may be used to expand the shield 160. The gas device 170 may also be used to retract the shield 160. For example, the impeller within the fan may reverse direction and propel gas out of the interior of the shield 160. The shield 160 may also include a valve (not shown) configured to release the air therein.

In some examples, both the air pressure detected by sensor 195 and air flow detected by gas sensor 175 may be used to determine whether the shield 160 is fully inflated. If the amount of gas input by the nozzle 180 into the shield 160 would indicate that the shield 160 is fully expanded, but the air pressure would indicate otherwise, the controller 150 may determine that the shield 160 has a hole. That is, because air is leaving through the hole, the air pressure is too low when compared with the amount of air supplied to the shield 160.

The shield 160 may include one or more conductive rings 185. The ring 185 may be made of Litz wire. The conductive ring 185 may be arranged around the perimeter of the extended shield 160. An Eddy current may be passively induced in the ring 185 during WPT. The Eddy current may create a field around the perimeter of the shield 160, thus directing any electromagnetic field inward toward the interior of the shield 160. This may result in reduced electromagnetic field (EMF) exposure and radiation outside of the shield 160.

In an example in which the shield 160 includes the conductive ring 185 (or multiple rings 185), the sensor 195 may be a camera configured to detect the location and expansion of the rings 185. Images captured by the camera may be configured to determine the location of the ring 185 and thus be used to determine whether the shield 160 is fully extended.

In another example, the interior of the shield 160 may include a grid-like pattern which may be captured by images taken by the camera. The pattern may be used to determine the state of expansion of the shield 160. For example, if the interior of the shield 160 is imaged and the grid lines appear close together, the controller 150 may determine that the shield 160 is not fully inflated. However if the imaged interior shows grid-lines that are what the controller 150 would deem an appropriate distance, the shield 160 may be determined to be fully inflated. The controller 150 may perform measurements on the images captured by the camera to determine whether the distance between the grid-lines exceeds a threshold. The grid-lines may be at least one of horizontal, vertical and diagonal.

The camera may also be an infrared camera configured to determine the temperature at the bottom of the assembly 155 (e.g., the temperature at the primary coil 105.) The shield 160 may aid to keep the camera lens clean thus enabling repeatable imaging and detection.

Figure 3:
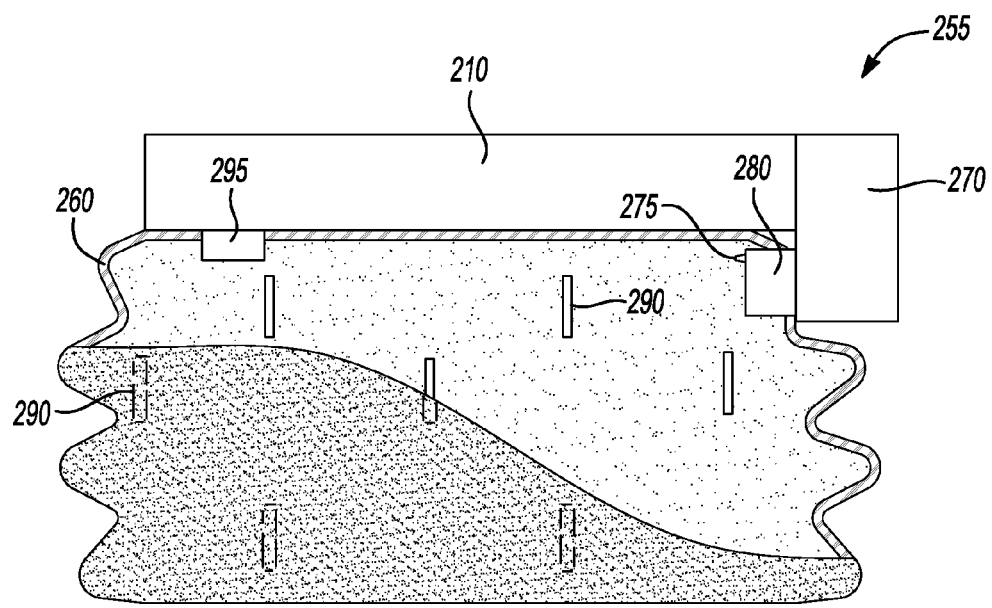

FIG. 3 illustrates another shield assembly 255. (With regard to FIGS. 2 through 8, similarly numbered elements have similar descriptions.) The shield 260 of the illustrated shield assembly 255 may include a plurality of ferrite panels 290 on the inside of (or embedded within) the shield 260. These panels 290 may be arranged around and throughout the flexible shield 260 and may be configured to increase the magnetic coupling coefficient within the charging area and reduce EMF and electromagnetic current (EMC) exposure while still maintaining the collapsibility of the shield 260. The ferrite pads 290 may be staggered (or aligned) throughout the interior of the shield 260 so that the shield 260 may maintain its flexibility. Additionally or alternatively, the pads 290 may be arranged in outside pockets of the shield 260.

Figure 4:
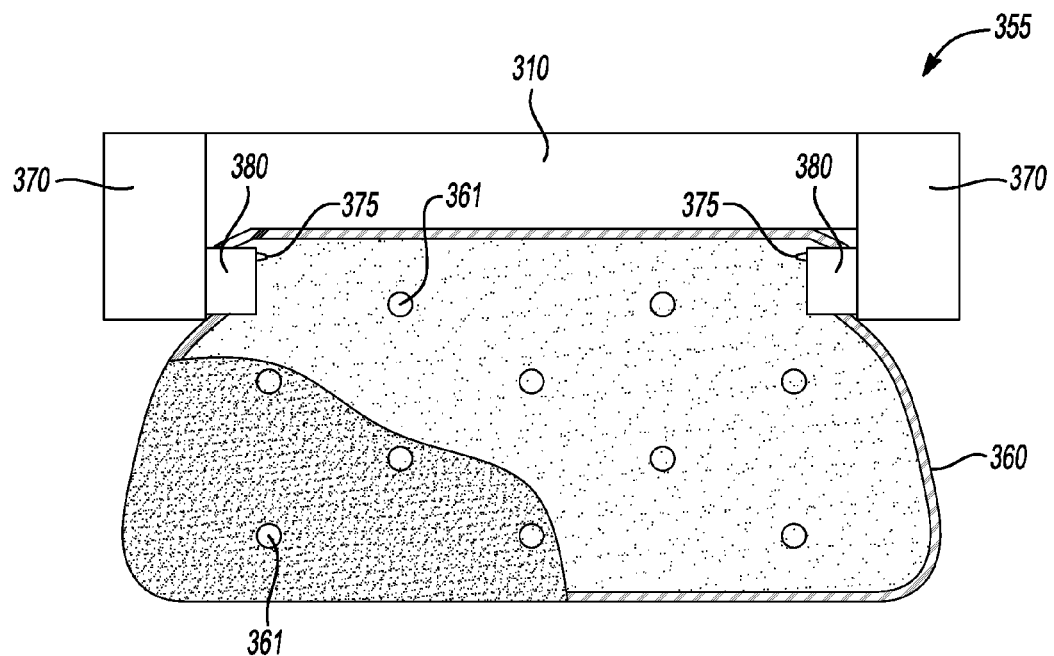

FIG. 4 illustrates another shield assembly 355 in which the shield 360 may define a plurality of holes 361. The holes 361 may allow air or gas to pass from the interior of the shield 360 to the exterior. The holes 361 may be large enough to allow air or gas to pass, but small enough so as to not substantially affect the inflatability of the shield 360.

By permitting air or gas to leave the interior of the shield 360, air flow around the corresponding coil assemblies and charging area may be created. During WPT, high temperatures may be a concern and such air flow may facilitate the cooling of the coil assemblies.

Figure 5:
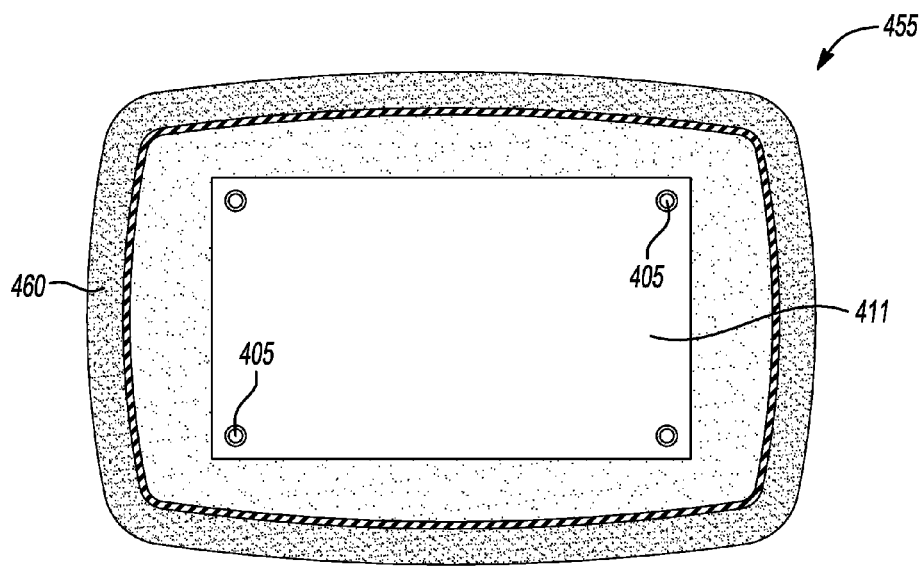
FIGS. 5 and 8 illustrate plan views, in cross-section, of shield assemblies (the sections are taken through the shields such that one is looking into and at the bottom of the shields)

FIG. 5 illustrates a plan view, in cross-section, of an extended shield assembly 455. The shield assembly 455 may include a base 410. The base may be a rigid member configured to abut a corresponding primary coil assembly upon inflation of the shield 460. The base 410 may have a rectangular shape and aid in maintaining the shape of the shield 460. Attached to the base 410 may be a plurality of support members 405 discussed in more detail with respect to FIG. 7.

Figure 6:
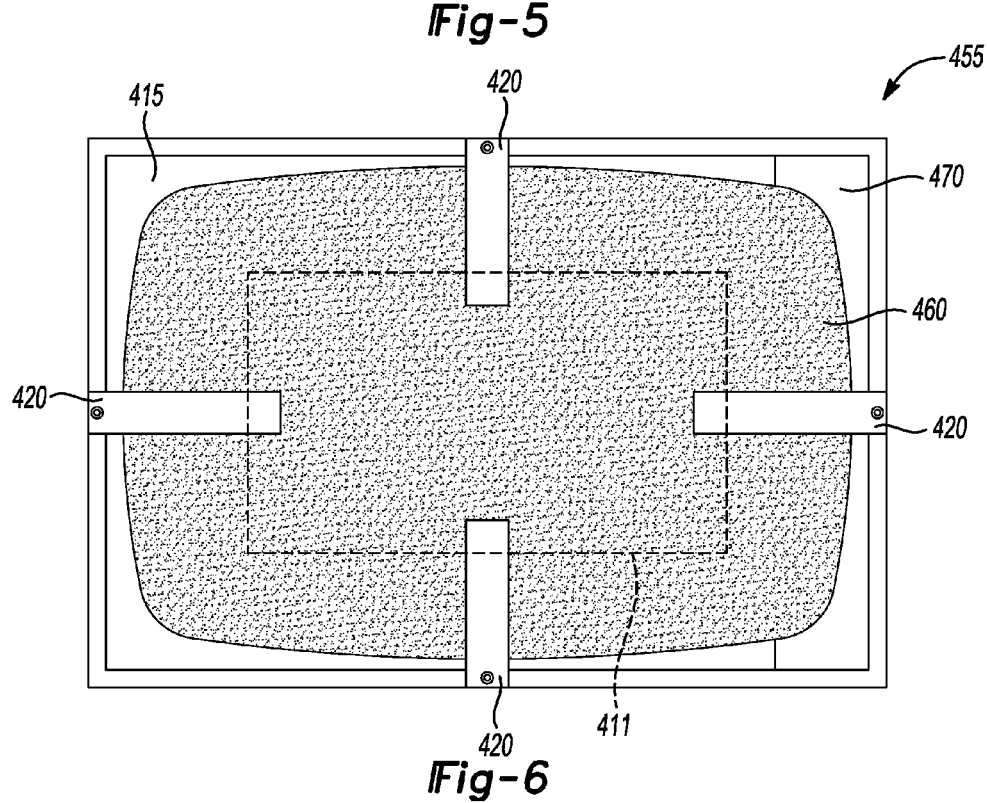
FIG. 6 illustrates a bottom view of a shield assembly.

FIG. 6 illustrates a bottom view of the retracted shield assembly 455. Prior to the shield 460 being extended, it may be tucked into a receptacle 415 within the shield assembly 455. The receptacle may house the shield 460 during non-use so that the shield 460 may be protected and not interfere with normal vehicle operations. The assembly 455 may include at least one latch 420 that maintains the shield 460 within the receptacle. The latch 420 may extend from the outer side of the receptacle 415 to the base 410. When a corresponding secondary coil assembly couples with a primary coil assembly, the at least one latch 420 may be released upon a command from a control module, thus releasing the shield 460.

Figure 7:
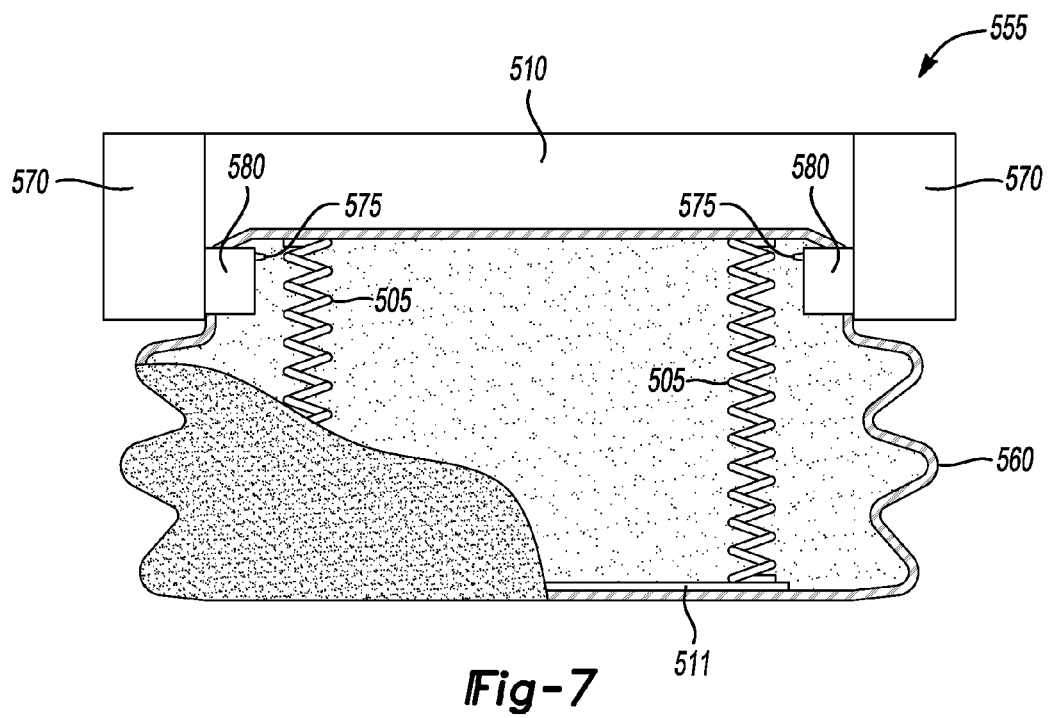

FIG. 7 illustrates another exemplary shield assembly 555 having support members 505. While air or gas supplied by the gas device 570 may inflate and extend the shield 560, support members 505 may also facilitate the extension of the shield 560. The support members 505 may supply structure to the flexible shield 560 and aid in maintaining the shape of the shield 560. Additionally, the support members 505 may be at least partially responsible for controlling the extension and retraction of the shield 560 by pushing or pulling the base 510 into or away from a corresponding secondary coil assembly.

In one example, the support members 505 may be telescoping supports extending from a coil assembly to reach a primary assembly. The support members 505 may also be (non-metal) springs, as shown in FIG. 7. In this example, the support members 505 may provide a retractable tension that, unless acted on, would force the shield 560 into a retracted position (e.g., to be held within the receptacle.) Air or gas flow provided by the gas devices 570 may counteract the retractive force to inflate and extend the shield 560. Upon ceasing to provide the air flow, the shield 560 may retract.

The support members 505 may be controlled by a control module. Additionally or alternatively, each support member 505 may have a controller associated therewith, or each may share a controller separate, but in communicate with, a central control module.

Figure 8:
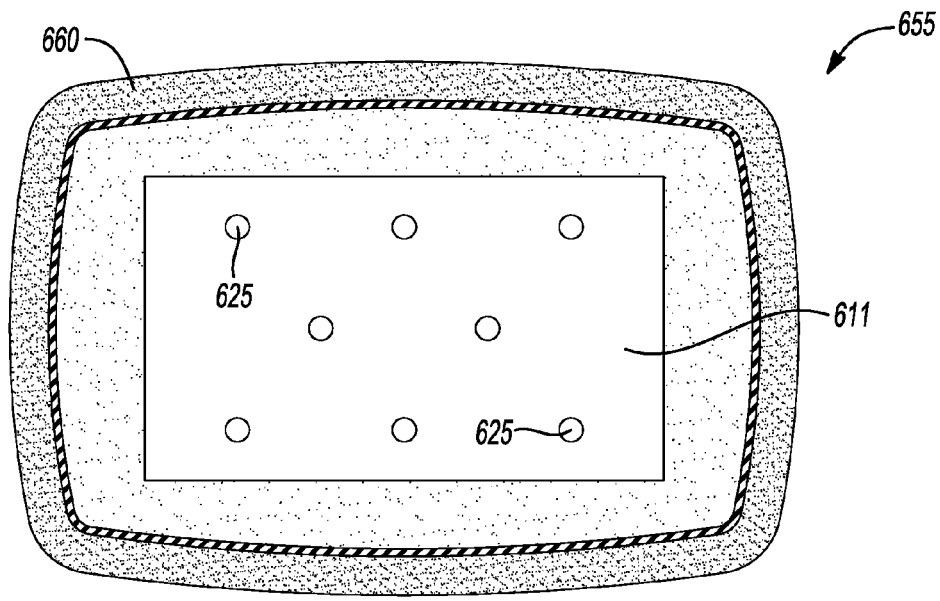

FIG. 8 illustrates a top view of an extended shield 660 in which the base 611 of the shield assembly 655 defines a plurality of base holes 625. The base holes 625 may permit air to reach a primary coil assembly and thus cool the assembly. Spacers (not shown) on a bottom of the base 611 may space the base 611 away from a corresponding primary assembly. The shields assemblies contemplated herein may form a closed barrier around the charging area. In some examples, the shield assembly may create a sealed enclosure. In other examples, the shield may create an un-sealed barrier, but still effectively limit EMF and EMC exposure, as well as prevent objects from entering the charging area.

Figure 9:
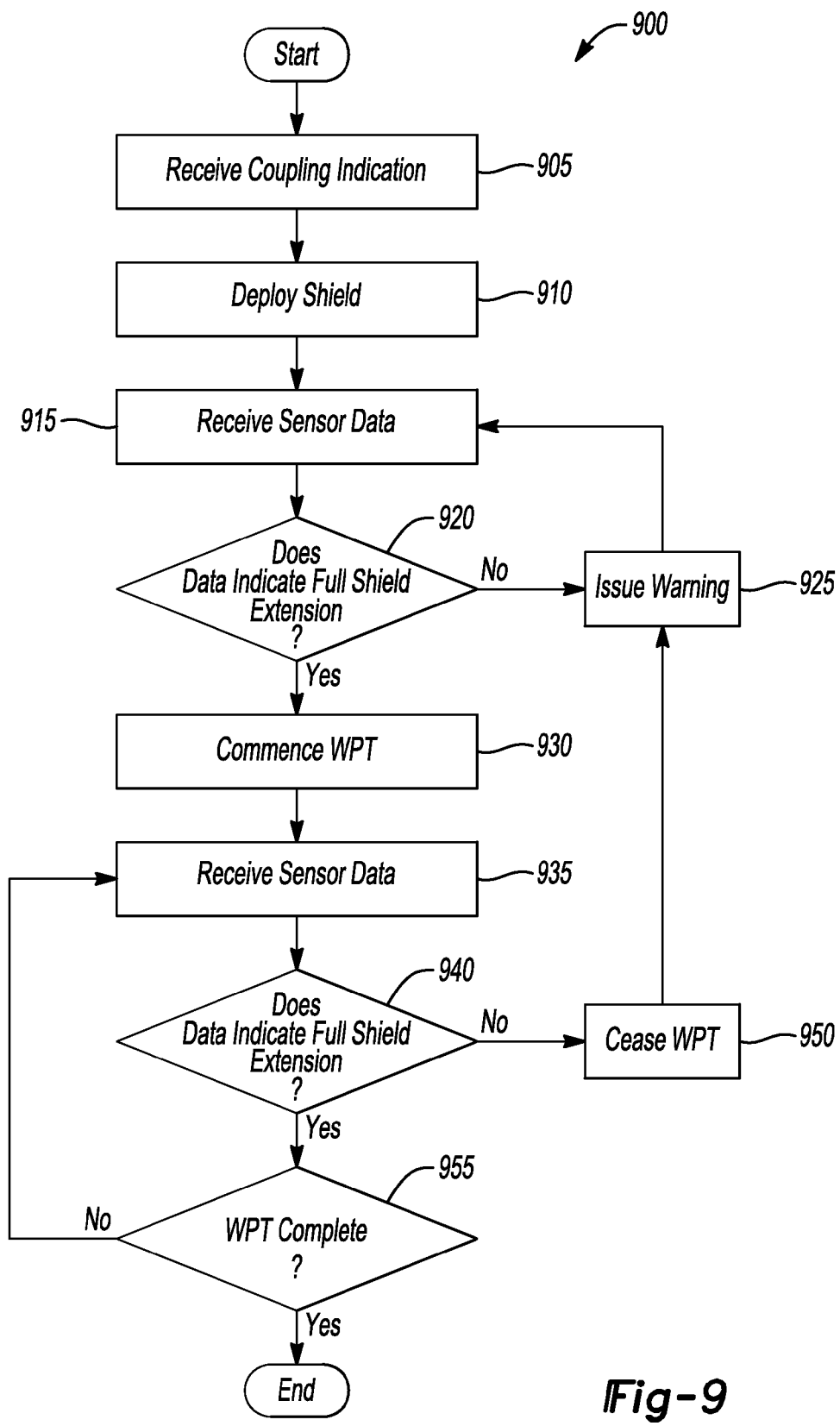
FIG. 9 illustrates a process for a wireless power transfer system.

FIG. 9 illustrates a process 700 for controlling the WPT based on the sensor data. The process may begin at block 705 in which the control module 150 may recognize that a coupling between the coil assemblies 105, 110 has occurred, or is about to occur. This coupling indication may be made upon the control module 150 receiving indications that the secondary coil assembly 110 has received a signal from the primary coil assembly 105, thus indicating that the two coil assemblies 105, 110 are aligned, and possibly prepared to engage in WPT.

At block 710, once a coupling indication has been received indicating that the coil assemblies 105, 110 are preparing for WPT, the control module 150 may instruct the shield 160 to deploy.

At block 715, the control modules 150 may receive the sensor data from the sensor 195. As explained above, the sensor data may include air pressure, distance, temperature, acoustics, etc., to indicate the extent of inflation.

At block 720, the control module 150 may determine whether the sensor data indicates that the shield 160 is fully extended. That is, the sensor data may be compared with a predefined threshold to determine whether or not the shield 160 is appropriately placed. If the sensor data indicates that the shield 160 is not fully extended, it may be the result of an object within the charging area preventing the shield 160 from being fully extended. If the sensor data does not indicate full extension/inflation, the process proceeds to block 725. If the data does indicate full extension/inflation, the process proceeds to block 730.

At block 725, the control module 150 may issue a warning indicating that an object may be obstructing the charging area. This warning may be an audio warning transmitted via the vehicle's audio system. It may also be a visual display on one of the vehicle's display screens. The process may then proceed to block 715 and continue to receive sensor data until the shield 160 fully extends.

At block 730, upon realization that the shield 160 is properly in place (e.g., fully extended/inflated), the control module 150 may instruct the coil assemblies 105, 110 to commence WPT. This may include transmitting a signal to the primary coil assembly 105 to initiate current flow through the primary coil.

At block 735, the control module 150 may continue to receive sensor data while WPT occurs. This continuous monitoring allows the shield assembly 155 to recognize if objects enter the charging area during power transfer.

At block 740, if the sensor data indicates anything less than a full extension of the shield 160, the process proceeds to block 750 in which the control module 150 instructs the WPT to cease. The process then proceeds to block 725. If the sensor data continues to indicate that the shield 160 is fully extended, the process proceeds to block 755. The process 700 continues to receive sensor data at block 735 until the WPT is complete at block 755. The process 700 then ends.

Computing devices described herein generally include computer-executable instructions in which the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a vehicle coil assembly configured to couple with a ground coil assembly in a presence of a magnetic field therebetween for wireless power transfer to the vehicle, and including an inflatable shield configured to extend from the vehicle and form a barrier around a portion of the magnetic field.

2. The vehicle of claim 1, wherein the shield comprises a flexible non-metallic and flame retardant material.

3. The vehicle of claim 1, wherein the shield includes a conductive loop configured to constrain leakage of the magnetic field.

4. The vehicle of claim 1, wherein the shield includes a plurality of ferrite panels configured to constrain leakage of the magnetic field.

5. The vehicle of claim 1, wherein the vehicle coil assembly includes at least one sensor configured to sense data indicative of a state of expansion of the shield.

6. The vehicle of claim 5, wherein the sensor is an air pressure sensor or an air flow sensor.

7. The vehicle of claim 5, wherein the sensor is a camera and the data includes images of the shield.

8. The vehicle of claim 5, wherein the sensor is an acoustic sensor and the data includes an acoustic frequency within the shield.

9. The vehicle of claim 5 further comprising a controller programmed to, in response to the data falling within a predetermined range, request wireless power transfer from the ground coil assembly.

10. The vehicle of claim 9, wherein the controller is further programmed to, in response to the data falling outside of the predetermined range, discontinue the wireless power transfer.

11. A primary coil assembly comprising:
a primary coil configured to couple with a secondary coil within a vehicle for wireless power transfer to the vehicle;
a shield assembly extending around the primary coil, and including a sensor configured to provide sensor data and an expandable shield configured to extend from the primary coil to the secondary coil to form a barrier around a portion of a magnetic field between the coils; and
a controller programmed to activate the primary coil based on the sensor data.

12. The assembly of claim 11, wherein the shield comprises a flexible non-metallic material.

13. The assembly of claim 11, wherein the sensor data represents expansion of the shield.

14. The assembly of claim 11, wherein the sensor data includes air pressure data indicative of air pressure within an interior of the shield and air flow data indicative of air supplied to the shield by an air inlet.

15. The assembly of claim 11, wherein the controller is further programmed to, in response to the sensor data falling outside a predetermined range, deactivate the primary coil.

16. The assembly of claim 11, wherein the shield assembly includes a conductive loop associated with a perimeter of the shield and configured to constrain leakage of the magnetic field.

17. The assembly of claim 11, wherein the shield assembly includes a plurality of ferrite panels associated with the shield and configured to constrain leakage of the magnetic field.

18. A wireless power transfer method comprising:
in response to data indicative of alignment between a primary inductive coil and a vehicle mounted secondary inductive coil, commanding a flexible shield surrounding one of the coils to expand towards the other of the coils; and
in response to data indicative of a pressure within the shield falling within a predefined range, commanding the primary inductive coil to initiate wireless power transfer to the secondary inductive coil.

19. The method of claim 18 further comprising, in response to the data indicative of the pressure within the shield falling outside of the predefined range, commanding the primary inductive coil to terminate the wireless power transfer.

20. The method of claim 18 further comprising, in response to data indicative of a temperature associated with the shield exceeding a threshold, commanding the primary inductive coil to terminate the wireless power transfer.

* * * * *